(12) United States Patent
Bajt et al.

(10) Patent No.: US 6,780,496 B2
(45) Date of Patent: Aug. 24, 2004

(54) OPTIMIZED CAPPING LAYERS FOR EUV MULTILAYERS

(75) Inventors: Sasa Bajt, Livermore, CA (US); James A. Folta, Livermore, CA (US); Eberhard A. Spiller, Livermore, CA (US)

(73) Assignee: EUV LLC, Santa Clara, CA (US)

( * ) Notice: Subject to any disclaimer, the term of this patent is extended or adjusted under 35 U.S.C. 154(b) by 55 days.

(21) Appl. No.: 10/066,108

(22) Filed: Feb. 1, 2002

(65) Prior Publication Data

US 2003/0008180 A1 Jan. 9, 2003

Related U.S. Application Data

(63) Continuation-in-part of application No. 09/898,833, filed on Jul. 3, 2001, now abandoned.

(51) Int. Cl.$^7$ ................................................ B32B 7/02
(52) U.S. Cl. ..................... 428/216; 428/336; 428/408; 428/457; 428/615; 428/641; 428/649; 428/663
(58) Field of Search .................................. 428/408, 457, 428/216, 446, 336, 615, 641, 663, 649

(56) References Cited

U.S. PATENT DOCUMENTS

| | | | | |
|---|---|---|---|---|
| 5,265,143 A | * | 11/1993 | Early et al. | |
| 5,307,395 A | * | 4/1994 | Seely et al. | |
| 5,433,988 A | * | 7/1995 | Fukuda et al. | |
| 6,011,646 A | * | 1/2000 | Mirkarimi et al. | |
| 6,110,607 A | * | 8/2000 | Montcalm et al. | |
| 6,160,867 A | * | 12/2000 | Murakami | |
| 6,295,164 B1 | * | 9/2001 | Murakami et al. | |

FOREIGN PATENT DOCUMENTS

| | | |
|---|---|---|
| EP | 1 065 568 A2 | 1/2001 |
| EP | 1 150 139 A2 A3 | 10/2001 |

* cited by examiner

*Primary Examiner*—Archene Turner
(74) *Attorney, Agent, or Firm*—John P. Wooldridge

(57) ABSTRACT

A new capping multilayer structure for EUV-reflective Mo/Si multilayers consists of two layers: A top layer that protects the multilayer structure from the environment and a bottom layer that acts as a diffusion barrier between the top layer and the structure beneath. One embodiment combines a first layer of Ru with a second layer of $B_4C$. Another embodiment combines a first layer of Ru with a second layer of Mo. These embodiments have the additional advantage that the reflectivity is also enhanced. Ru has the best oxidation resistance of all materials investigated so far. $B_4C$ is an excellent barrier against silicide formation while the silicide layer formed at the Si boundary is well controlled.

20 Claims, 3 Drawing Sheets

OPTIMIZED CAPPING LAYERS FOR EUV MULTILAYERS

This application is a continuation-in-part of U.S. patent application Ser. No. 09/898,833, titled "Optimized Capping Layers For EUV Multilayers" filed Jul. 3, 2001, now abandoned incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to capping layers for multilayer reflective coatings used in extreme ultraviolet or soft x-ray lithography applications.

2. Description of Related Art

Extreme ultraviolet (EUV) and soft x-ray projection lithography make use of optical elements with highly reflective multilayer coatings. These multilayer coatings typically consist of alternating layers of molybdenum (Mo) and silicon (Si) or molybdenum and beryllium (Be). High EUV reflectivity is essential for lithography applications. A critical limitation to achieving the maximum theoretical peak reflectivity is the oxidation and corrosion of the top layers, which both increases the absorption and degrades the phase coherence of the reflection from these layers.

Although there have been numerous investigations of carbon-based, boron carbide-based, and silicon-based multilayer coatings for EUV mirrors, there has been little work on environmental effects (e.g., oxidation and corrosion) of these structures. Underwood et al. (Applied Optics 32:6985 (1993)) investigated the aging effects of Mo—Si multilayers by monitoring the decrease in reflectivity with time. Their experimental results showed a degradation of the Mo—Si multilayer reflectance caused by the oxidation of the topmost layer of molybdenum. Underwood et al. identified the oxidation of the molybdenum layer as a potential problem in soft x-ray projection lithography. The proposed solutions were to make silicon the topmost layer, to store the optical elements in an inert atmosphere or vacuum, or to remove the oxidized surface by sputtering or chemical etching. Underwood et al. did not investigate the use of passivating layers.

Mo/Si multilayers with Mo as the top layer have the highest theoretically possible reflectivity; however, Mo is not stable in air and therefore Mo/Si multilayers for EUV optics are usually capped with a Si top layer with a loss in reflectivity of 1.3%. After exposure to air, this layer partly oxidizes and forms $SiO_2$ that absorbs EUV light and reduces the reflectance of the multilayer by about another 1–2% This reflectance of Si capped multilayers will remain unchanged for years if the multilayers are kept at room temperatures. See C. Montcalm, S. Bajt, P. B. Mirkarimi, E. Spiller, F. J. Weber, and J. A. Folta, in "Emerging Lithographic Technologies II", ed. Y. Vladimirsky, SPIE Vol 3331, 42–51 (1998). However, in a working EUV lithography tool the coatings are exposed to EUV illumination in the presence of low pressure background gases including water, oxygen, and hydrocarbons. L. Klebanoff et al., M. Wedowski et al. references have shown that the reflectance of Si capped Mo/Si multilayers decreased as a function of EUV illumination dose and the amount of water vapor and other background gases in the system.

U.S. Pat. No. 5,958,605, titled "Passivating Overcoat Bilayer For Multilayer Reflective Coatings For Extreme Ultraviolet Lithography", discloses a passivating overcoat bilayer that is used for multilayer reflective coatings for extreme ultraviolet (EUV) or soft x-ray applications to prevent oxidation and corrosion of the multilayer coating, thereby improving the EUV optical performance. The overcoat bilayer comprises a layer of silicon or beryllium underneath at least one top layer of an elemental or a compound material that resists oxidation and corrosion. Materials for the top layer include carbon, palladium, carbides, borides, nitrides, and oxides. The thicknesses of the two layers that make up the overcoat bilayer are optimized to produce the highest reflectance at the wavelength range of operation. Protective overcoat systems comprising three or more layers are also possible.

SUMMARY OF THE INVENTION

It is an object of the present invention to provide a passivating overcoat bilayer for a multilayer reflective coating designed for use in extreme ultraviolet or soft x-ray applications.

It is another object of the invention to provide a bottom overcoat layer that prevents diffusion of a top overcoat layer into the top layer of a multilayer reflective coating.

It is another object of the invention to provide a top overcoat layer made of material that resists oxidation and corrosion and protects a multilayer reflective coating from oxidation.

These and other objects will be apparent based on the disclosure herein.

The present invention is a passivating overcoat bilayer for multilayer reflective coatings for soft x-ray or extreme ultraviolet applications and the method for making such layers. These passivating layers are useful for reflective optical coatings for soft x-ray and extreme ultraviolet wavelengths in applications such as microscopy, astronomy, spectroscopy, laser research, laser cavities and optics, synchrotron optics, and projection lithography.

A passivating overcoat bilayer (also called a "capping" bilayer) is deposited on top of a multilayer coating to prevent oxidation and corrosion of the multilayer coating, thereby improving the EUV optical performance. The multilayer coating can comprise alternating layers of a variety of materials, such as molybdenum-silicon, molybdenum carbide-silicon, molybdenum-beryllium, and molybdenum carbide-beryllium. The passivating bilayer comprises a diffusion resistant layer underneath at least one top layer of an elemental material or compound that resists oxidation and corrosion. Oxidation resistant materials for the top layer (or layers) may include pure elements, such as Ru, Zr, Rh or Pd, and similar materials or compound materials. Diffusion resistant materials for the bottom layer include $B_4C$, Mo and carbon and similar materials or compound materials. The top layer and the bottom layer may each comprise a plurality of layers.

The thickness of each layer that makes up the overcoat bilayer is in the range of about 0.5 to 7 nanometers, and the thicknesses are selected to produce the highest reflectance at the EUV wavelength range of operation. The thickness of the overcoat bilayer will typically be different from the thickness of the pairs of alternating layers in the underlying multilayer coating. The thickness of the two layers in the overcoat are individually optimized so as to provide sufficient chemical protection and to maximize EUV optical performance.

DETAILED DESCRIPTION OF THE PREFERRED EMBODIMENTS

Figure 1:
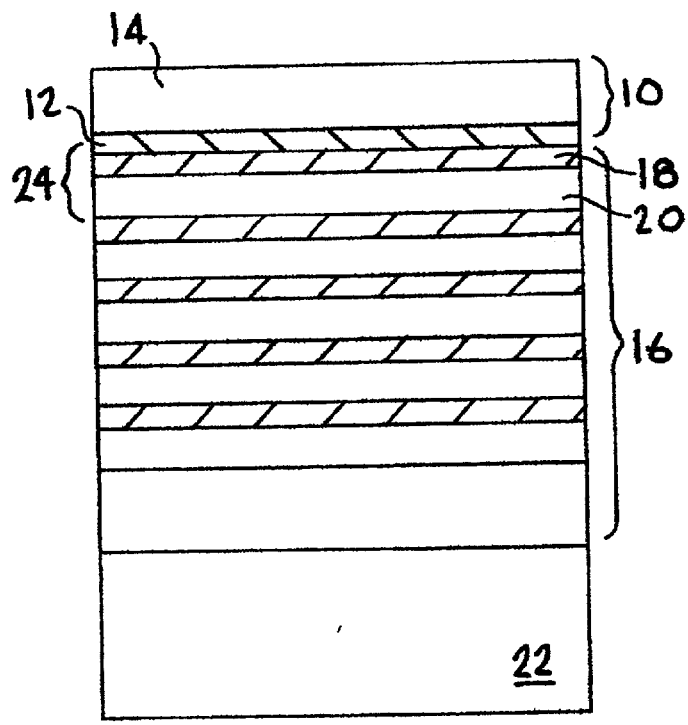
FIG. 1 shows passivating overcoat bilayer of the present invention on a multilayer reflective coating.

The present invention is a passivating overcoat bilayer for a multilayer reflective coating and is shown schematically in FIG. 1. The overcoat bilayer 10 is made up of a top layer 14, and a bottom layer 12. Top layer 14 comprises a material that resists corrosion and oxidation and protects the underlying layers from oxidation. The bottom layer 12 is deposited on a multilayer coating 16, which typically comprises alternating layers of an absorber material 18 and a spacer material 20. The multilayer coating 16 is deposited on a substrate 22. Bottom layer 12 comprises a material that prevents diffusion of the top layer 14 into the top layer 18 of the multilayer coating 16. The present invention contemplates including a plurality of components and layers within top layer 14 and/or bottom layer 12.

Ru is very stable against oxidation in the environment of a EUV camera. However, a loss in reflectance of 1%–5% is observed over the standard reference coating. This loss is due to the diffusion of Ru and Si and the formation of ruthenium silicide. For a successful capping layer system, an additional layer that acts as diffusion barrier between the Ru and the underlying structure is therefore needed. Other elements that can be substituted for Ru in the present invention include Zr, Rh and Pd and similar materials and compounds.

Figure 2:
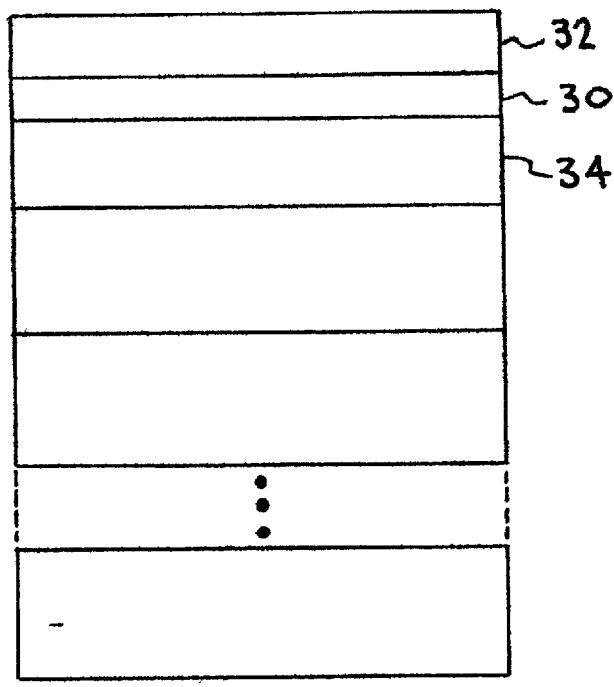
FIG. 2 shows an embodiment that uses a diffusion barrier of Mo under a Ru layer.
Figure 3:
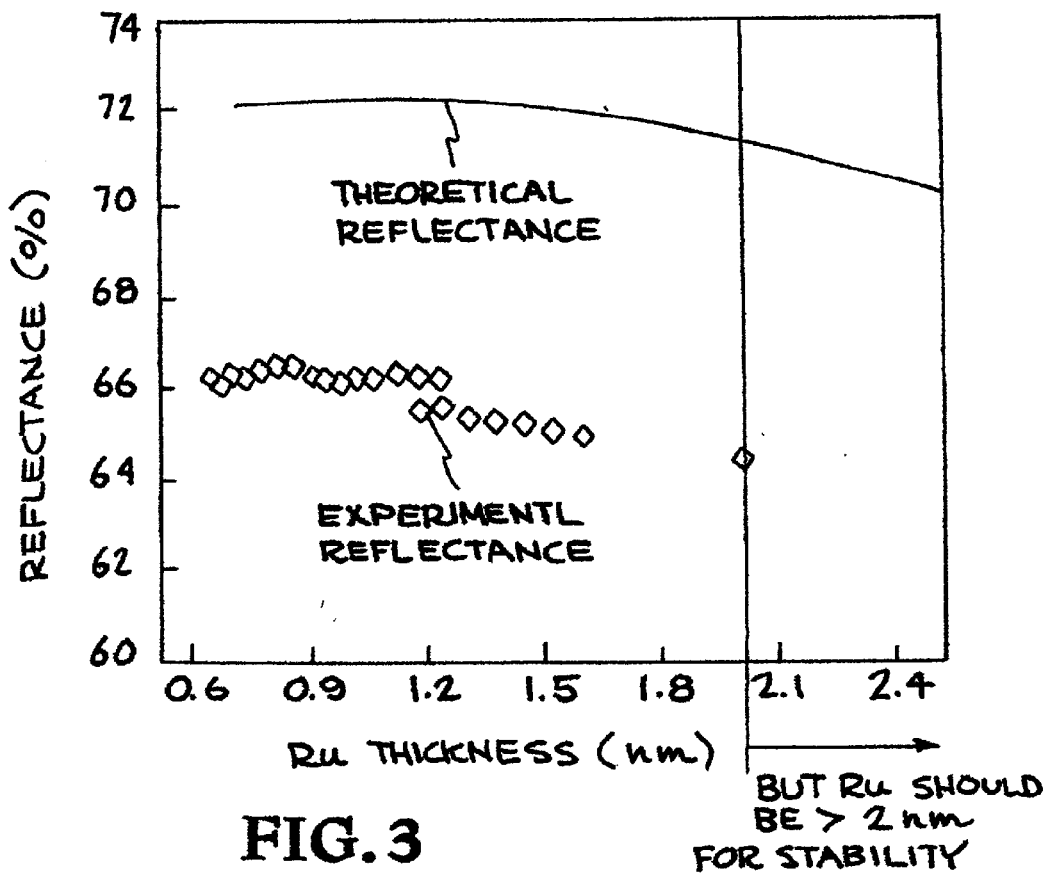
FIG. 3 shows optimization of the thicknesses of Ru and Mo to obtain the highest reflectances.

The embodiments discussed herein contain both the oxidation protection and the diffusion barrier. Both systems use a top layer of Ru as the protection against oxidation. FIG. 2 shows an embodiment that uses a diffusion barrier 30 of Mo under the Ru layer 32 and on top of the last Si layer 34 in the first system. The molybdenum layer acts as the diffusion barrier between the Ru layer and the Si layer. Multilayers capped with 1.3 nm of Mo and between 0.6 nm and 2 nm of Ru have been produced. This embodiment has measured over 67% reflectance. FIG. 3 shows optimization of the thicknesses of Ru and Mo to obtain the highest reflectances. Diffusion barrier 30 may be formed from other materials such as, e.g., carbon.

Figures 4A, 4B:
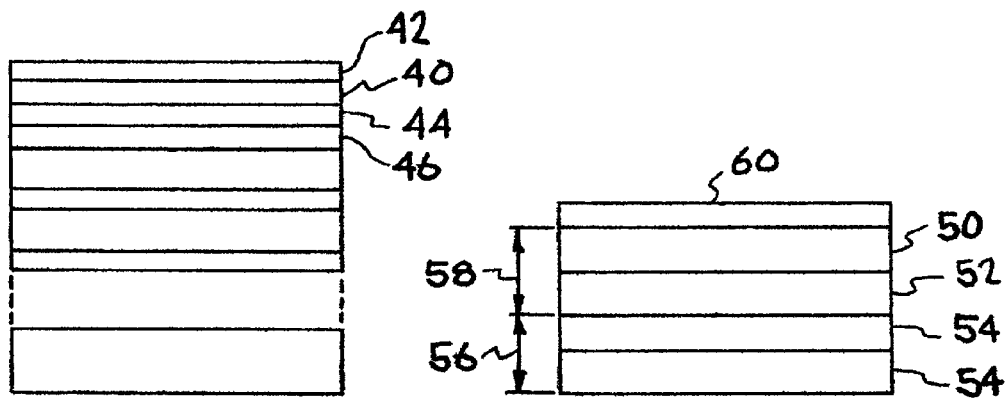
FIG. 4A shows an embodiment that provides a diffusion barrier of $B_4C$ under the Ru layer.
FIG. 4B illustrates the replacement with $B_4C$ of the top part of the last Si layer of the multilayer reflective coating.
Figure 5:
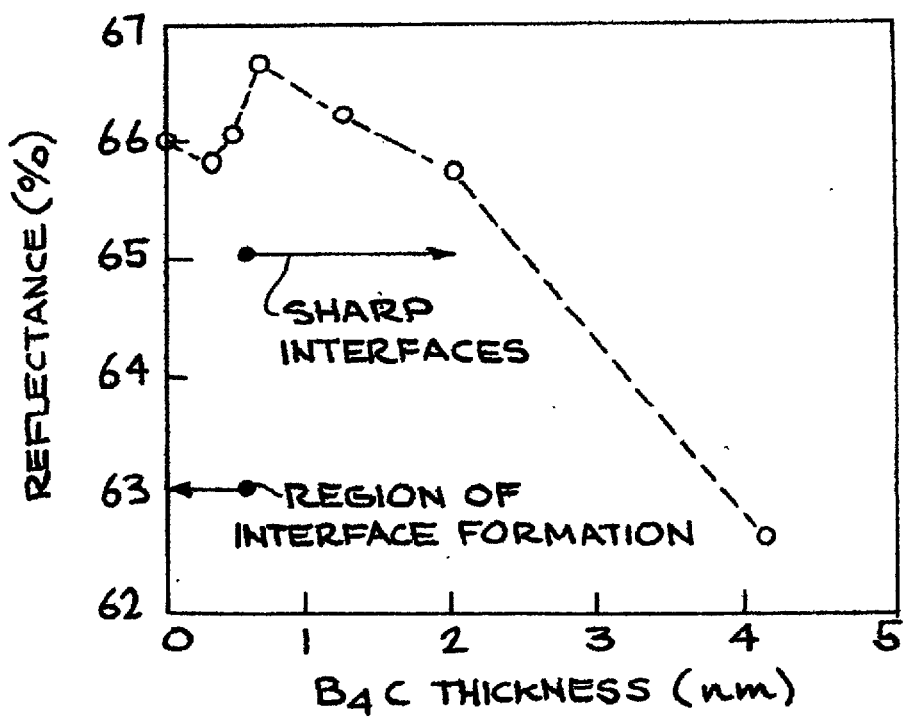
FIG. 5 shows the optimum $B_4C$ barrier thickness is a tradeoff between reflectance and interdiffusion.
Figure 6:
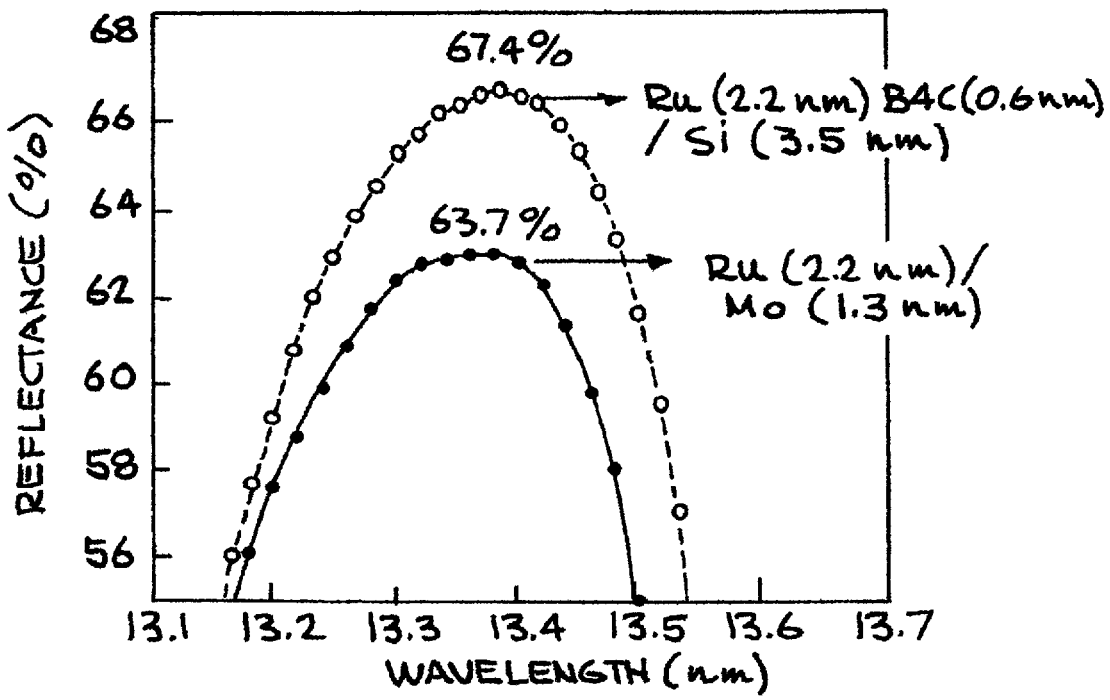
FIG. 6 shows the reflectance as a function of wavelength of a Ru/$B_4C$/Si capping layer system and a Ru/Mo capping layer system where the Ru layers are 2.2 nm thick.

FIG. 4A shows an embodiment that provides a diffusion barrier 40 of $B_4C$ under the Ru layer 42 and on top of the last Si layer 44, which is on Mo layer 46. Ru/$B_4C$ multilayers form very smooth and compositionally abrupt interfaces. Thermal annealing at 100° and 250° C. produced no measurable change in the reflectance. A theoretical calculation shows a 2–3% reflectance loss if the last Si layer is replaced with $B_4C$ due to the less favorable optical properties of $B_4C$ in the EUV energy range. Experimental data support this prediction. However, this loss can be greatly reduced by replacing only the top part of the last Si layer with $B_4C$, as shown in FIG. 4A. Experiments exploring how far the thickness of $B_4C$ can be reduced have shown that the boron carbide layer must be at least 0.6 nm or thicker. The expected reflectance loss is only 0.6% if $B_4C$ replaces ⅓ of the last Si layer. In this case boron carbide is about 1.3 nm thick. The experimental data in FIG. 5 shows that the optimum $B_4C$ barrier thickness is a tradeoff between reflectance and interdiffusion. FIG. 6 shows the reflectance as a function of wavelength of a Ru/$B_4C$/Si capping layer system and a Ru/Mo capping layer system where the Ru layers are 2.2 nm thick FIG. 4B shows an embodiment where the top Si layer of a Si/Mo multilayer structure has been entirely replaced with a $B_4C$ layer 50. In the figure, the multilayer structure is formed of alternating layers of Mo (52) and Si (54). It can be seen that the thickness 56 of one pair of alternating layers of the multilayer structure is the same as the combined thickness 58 of the Mo layer 54 and the $B_4C$ layer 50. Ru layer 60 is shown on top of the $B_4C$ layer 50. Diffusion barrier 50 may be formed from other materials such as, e.g., carbon.

Referring again to FIG. 1, a multilayer coating 16 that is designed for applications in extreme ultraviolet (EUV) lithography is typically made of a periodic stack of 40–100 alternating layers of molybdenum (Mo) and silicon (Si), or molybdenum and beryllium (Be). Although other structures are possible (e.g., non-periodic stacks, multilayer stacks with other materials or with more than two materials), the combinations of Mo and Si in one case and Mo and Be in another case, exhibit unusually high normal incidence reflectivity (at least 65%) in the EUV wavelength region (i.e., less than about 15 nanometers). When Mo and Si or Mo and Be are used for the multilayer stack, the topmost layer of the multilayer coating 16 would typically be molybdenum (the absorber material). However, since molybdenum is not stable in air, the additional overcoat bilayer is needed. It should be recognized that the Mo in the Mo/Si multilayer structures could be replaced with an absorber layer comprising another material. For example, the Mo can be replaced with molybdenum carbide or $Mo_2C$. It should also be appreciated that the Mo in a Mo/Be multilayer structure can be replaced by MoRu.

In two of the embodiments discussed, the bottom layer 12 of the overcoat bilayer 10 is made up of either $B_4C$ or Mo. The top layer 14 is deposited or grown on the bottom layer 12 and comprises Ru, which is a material that resists oxidation and corrosion, and has a low chemical reactivity with common atmospheric gas species such as oxygen, nitrogen, and water vapor. For purposes of this disclosure, "deposition" of the top layer is intended to encompass the concepts of both "depositing" and "growing". This top layer 14 serves to chemically passivate and protect the underlying multilayer coating 16 and to preserve the high reflectance of the coating.

The passivating overcoat can be grown using a vapor phase deposition technique (e.g., sputtering). This method can be incorporated into the multilayer deposition system (e.g., magnetron sputtering with argon plasma) so that the multilayer stack can be encapsulated in situ without exposure to the atmosphere. Alternatively, the overcoat can be grown by chemical reaction.

The thicknesses of the bottom layer 12 and the top layer 14 of the overcoat bilayer 10 are chosen to produce the highest reflectance and offer high oxidation resistance at the EUV wavelength of operation, in a similar manner to how the thicknesses of both layers in the underlying periodic multilayer stack 16 were determined.

As discussed in U.S. Pat. No. 3,887,261, titled "Low-loss reflection coatings using absorbing materials", the best reflecting multilayer geometry is usually a quarter-wave stack, where the optical thickness of each layer is equal to a quarter of the wavelength of interest at normal incidence. (The optical thickness of a layer is the product of the geometrical or metric thickness and the refractive index of the material.) In the quarter-wave stack, the beams reflected from each interface are in phase and add constructively. This design is ideal when both materials in the stack are non-absorbing, and still remains the best when the extinction coefficients of the two materials are similar. However, when the absorption of one of the two materials is larger, as in the case of EUV multilayer mirrors, the design of the stack must be modified to reduce the overall absorption. The thickness of the absorber is reduced, while the period thickness 24 is kept constant. Therefore, thicknesses are determined by the trade-off between maximizing the constructive interference of the beams reflected at each interface and minimizing the overall absorption to enable more interfaces to contribute to the reflectance.

In the present invention, the thickness of the overcoat bilayer 10 is adjusted to provide the best phase matching with the underlying multilayer coating 16 in order to achieve the highest EUV reflectance while maintaining the highest oxidation resistance. For the Mo/Si and Mo/Be systems, the thickness of each layer in the overcoat bilayer is in the range of 0.5 to 7 nanometers.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A passivating overcoat bilayer for a multilayer reflective coating designed for use in extreme ultraviolet or soft x-ray applications, comprising:
    a multilayer reflective coating comprising a plurality of alternating layers of relatively high index material and low index material, wherein said multilayer reflective coating comprises a top surface and a bottom surface;
    a substrate, wherein said bottom surface is affixed directly to said substrate;
    a bottom overcoat layer affixed directly to said top surface of said multilayer reflective coating; and
    a top overcoat layer affixed directly to said bottom overcoat layer, wherein said bottom overcoat layer comprises material that prevents diffusion of said top overcoat layer into said top layer of said multilayer reflective coating, wherein said top overcoat layer comprises material that resists oxidation and corrosion and protects said multilayer reflective coating from oxidation.

2. The overcoat bilayer of claim 1, wherein said bottom overcoat layer comprises boron carbide.

3. The overcoat bilayer of claim 1, wherein said bottom overcoat layer comprises molybdenum.

4. The overcoat bilayer of claim 1, wherein said bottom overcoat layer comprises carbon.

5. The overcoat bilayer of claim 1, wherein said top overcoat layer comprises ruthenium.

6. The overcoat bilayer of claim 1, wherein said top overcoat layer comprises material selected from the group consisting of Zr, Rh and Pd.

7. The overcoat bilayer of claim 1, wherein said top overcoat layer comprises a plurality of components.

8. The overcoat bilayer of claim 1, wherein said top overcoat layer comprises a plurality of layers.

9. The overcoat bilayer of claim 1, wherein said bottom overcoat layer comprises about 1.3 nm of Mo and wherein said top layer comprises between 0.6 nm and 2 nm of Ru.

10. The overcoat bilayer of claim 1, wherein said bottom overcoat layer comprises $B_4C$, wherein said top layer of said multilayer coating comprises silicon.

11. The overcoat bilayer of claim 1, wherein said top overcoat layer and said bottom overcoat layer of said overcoat bilayer have optimum thicknesses selected such that the bilayer overcoat is phase-matched with the underlying multilayer coating.

12. The overcoat bilayer of claim 1, wherein said top overcoat layer and said bottom overcoat layer have thicknesses, wherein the thickness of said top overcoat layer is selected to protect the underlying layers from oxidation, and wherein the thickness of the bottom layer is selected such that the bilayer overcoat is phase-matched with the underlying multilayer coating.

13. The overcoat bilayer of claim 1, wherein said top overcoat layer and said bottom overcoat layer have thicknesses that are optimized to maximize the normal incidence reflectance at an operating wavelength of less than about 15 nanometers.

14. The overcoat bilayer of claim 1, wherein said top overcoat layer has a thickness ranging from about 0.5 nanometers to about 7 nanometers.

15. The overcoat bilayer of claim 1, wherein said bottom overcoat layer has a thickness ranging from about 0.5 nanometers to about 7 nanometers.

16. The overcoat bilayer of claim 1, wherein said multilayer reflective coating comprises a reflectance greater than about 65% at an operating wavelength of less than about 15 nanometers.

17. The overcoat bilayer of claim 16, wherein said alternating layers comprise a first layer comprising silicon and a second layer comprising molybdenum.

18. The overcoat bilayer of claim 16, wherein said alternating layers comprise a first layer comprising beryllium and a second layer comprising molybdenum.

19. The overcoat bilayer of claim 1, wherein said overcoat bilayer and said multilayer reflective coating have a normal incidence reflectivity of at least about 65% at an operating wavelength of less than about 15 nanometers, and wherein said multilayer reflective coating comprises silicon and molybdenum.

20. The overcoat bilayer of claim 1, wherein said overcoat bilayer and said multilayer reflective coating have a normal incidence reflectivity of at least about 65% at an operating wavelength of less than about 15 nanometers, and wherein said multilayer reflective coating comprises beryllium and molybdenum.

* * * * *